United States Patent Office 3,476,510
Patented Nov. 4, 1969

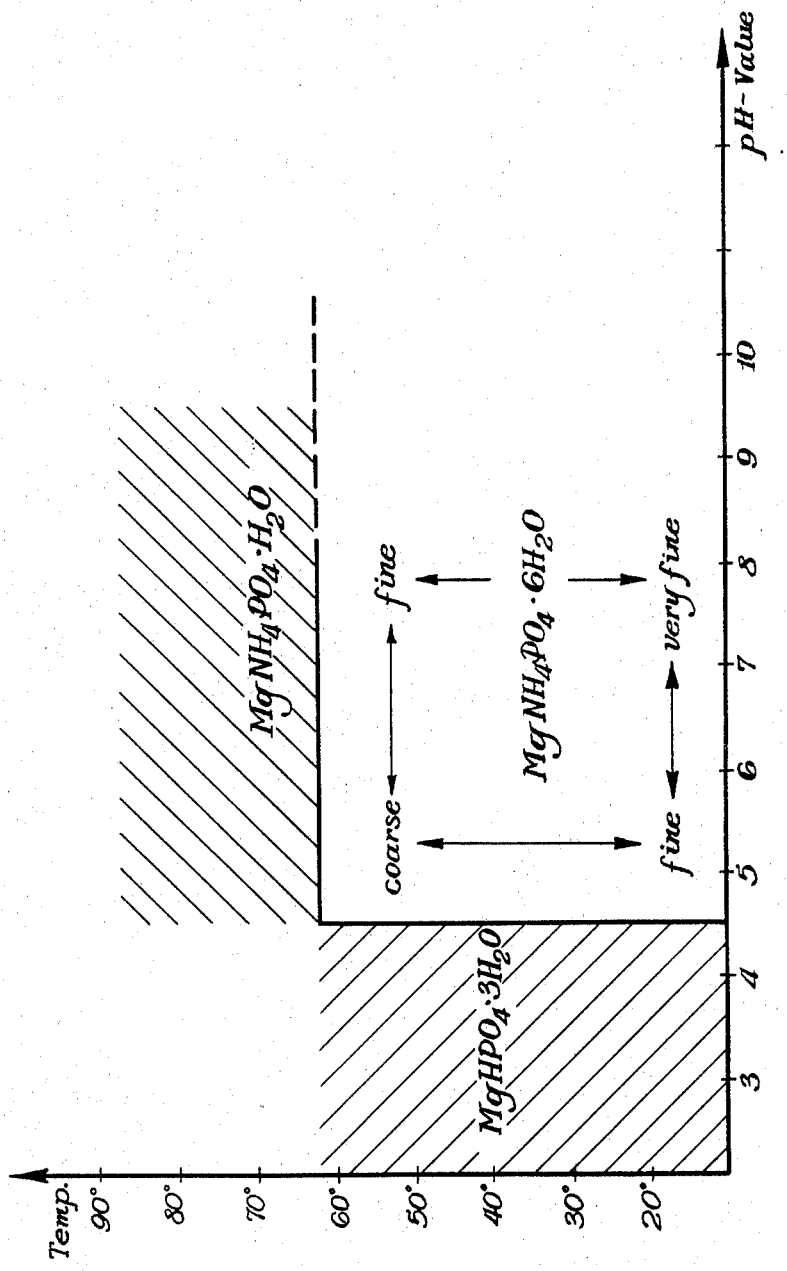

3,476,510
PROCESS FOR THE MANUFACTURE OF MAGNESIUM - AMMONIUM PHOSPHATE-HEXAHYDRATE
Winfried Kern, Hurth, near Cologne, Joseph Cremer, Hermulheim, near Cologne, and Heinz Harnisch, Lovenich, near Cologne, Germany, assignors to Knapsack Aktiengesellschaft, Knapsack bei Köln, Germany, a corporation of Germany
Filed Jan. 3, 1967, Ser. No. 606,722
Claims priority, application Germany, Jan. 19, 1966, K 58,176
Int. Cl. C01b 25/34; A61k 7/16
U.S. Cl. 23—105      4 Claims

ABSTRACT OF THE DISCLOSURE

Production of magnesium-ammonium phosphate-hexahydrate having a definite particle size from phosphoric acid, a magnesium salt solution, an aqueous solution of ammonia or gaseous ammonia and, if desired, an alkali liquor at temperatures lower than 60° C. The reactants are introduced jointly at a temperature between 10 and 60° C., with agitation, into a reactor while maintaining a pH-value of 4 to 8. Coarse-grained and fine-grained matter can be obtained by varying temperature and pH-value.

---

The present invention relates to a process for the manufacture of magnesium-ammonium phosphate hexahydrate from phosphoric acid, a magnesium salt solution, an aqueous solution of ammonia or gaseous ammonia and, if desired, an alkali liquor at temperature lower than 60° C.

It is known that magnesium-ammonium phosphate-hexahydrate can be produced at temperature lower than 60° C. by the joint and continuous introduction of phosphoric acid, a magnesium salt solution and a solution of ammonia or gaseous ammonia into a reactor.

In many cases, particularly in the production of magnesium-ammonium phosphate-hexahydrate intended for use as the cleaning agent in tooth paste, it is very important that the compound be obtained with a definite particle size, when its intended use makes this desirable. In all those cases in which the precipitation directly results in the formation of particulate magnesium-ammonium phosphate-hexahydrate having the desired particle size, it is unnecessary subsequently to subject the precipitated matter to costly grinding, during which magnesium-ammonium phosphate-hexahydrate has been found to tend to baking and the formation of lumps.

It has now unexpectedly been found that magnesium-ammonium phosphate-hexahydrate formed of particles having a definite particle size is obtained by the joint introduction of the reactants with agitation, at a temperature between 10 and 60° C., into a reactor, while maintaining a pH-value of 4 to 8, preferably of 5 to 8. Coarse-grained matter is obtained by reacting the starting materials at the higher temperatures and the lower pH-values within the limits specified above. Conversely, fine-grained matter is obtained by reacting the starting materials at the lower temperatures and the higher pH-values within the limits specified above. More particularly, magnesium-ammonium phosphate-hexahydrate formed of particles of which more than 5% have a size larger than 40µ is produced at temperatures between 40 and 60° C. and at a pH-value between 5 and 7, and fine-grained product formed of particles of which less than 1% has a size larger than 40µ is produced at temperatures between 10 and 30° C. at a pH-value between 5 and 8.

The influence exerted by the precipitation conditions on the particle size of the final product has already been reported in connection with dicalcium phosphate production. In this case, no more than two types of ions are reacted with one another, and the conditions are therefore other than those in the present case, wherein three types of ions are subjected to the reaction. The fact that temperature and pH-valve are factors to be considered in precipitating $MgNH_4PO_4 \cdot 6H_2O$ is therefore an unexpected result which could not be foreseen.

The annexed diagram is a rough schematic representation of the relations existing between the particle size of $MgNH_4PO_4 \cdot 6H_2O$ and the pH-value and temperature conditions used while precipitating it.

The following examples illustrate the process of the present invention.

EXAMPLE 1

672 grams of an aqueous $MgCl_2$-solution (31.9% strength by weight), 257 grams $H_3PO_4$ (85.75% strength by weight), 368 grams NaOH (48.1% strength by weight), and 143 grams of a $NH_3$-solution (27.0% strength by weight) were introduced jointly at 60° C. within 15 minutes, with strong agitation and while maintaining a pH-value of about 6, into 700 cc. water previously placed in a heatable and coolable stainless steel container having a capacity of 5 liters. The reaction product was isolated, washed and dried in conventional manner:

Screen analysis: 80% by weight; >40µ.
Analysis.—$P_2O_5$, 29.0% by weight; MgO, 16.8% by weight; $NH_3$, 6.4% by weight; loss on ignition, 54.8% by weight.

EXAMPLE 2

Solutions corresponding to those used in Example 1 were introduced jointly at 60 °C. into 700 cc. water while maintaining a pH-value of 7.

Screen analysis: 40% by weight; >40µ.
Analysis.—$P_2O_5$, 28.9% by weight; MgO, 16.9% by weight; $NH_3$, 6.5% by weight; loss on ignition, 54.8% by weight.

EXAMPLE 3

22.2 kg. of a $MgCl_2$-solution (29.0% strength by weight), 5.7 kg. NaOH (48.1% strength by weight), 7.8 kg. $H_3PO_4$ (85% strength by weight) and 8.3 kg. of a $NH_3$-solution (27.7% strength by weight) were introduced jointly at 36° C., within about 10 minutes, into 40 liters water previously placed in a reactor which had a capacity of 120 liters and was equipped with a propeller stirrer, a heating and cooling means. During the experiment, the temperature was found to increase to 45° C. The pH-value was maintained at 5.5. After the reaction, the product obtained was suction-filtered by means of a vacuum drum filter and dried as usual.

Screen analysis: 20% by weight; >40µ.
Analysis.—$P_2O_5$, 29.3% by weight; MgO, 15.9% by weight; $NH_3$, 6.6% by weight; loss on ignition, 54.3% by weight.

The above example shows that coarse-grained $$MgNH_4PO_4 \cdot 6H_2O$$

was obtained at high temperatures, the product being the coarser the smaller the pH-value during the precipitation.

In order to obtain fine-grained $MgNH_4PO_4 \cdot 6H_2O$, it was necessary to use low temperatures a high pH-values. The product so obtained was found to be the more fine-grained the higher the pH-value or the lower the precipitation temperature.

EXAMPLE 4

672 grams $MgCl_2$ (31.9% strength by weight), 258 grams $H_3PO_4$ (85.0% strength by weight), 368 grams NaOH (49.0% strength by weight) and 154 grams $NH_3$ (25.0% strength by weight) were introduced at a pH-value of 5 to 6, within 12 to 15 minutes, into 700 cc.

water having a temperature of 0° C. During the experiment, the temperature was found to increase to 20° C. The experiment was repeated three times, the final products were mixed and thereafter analyzed.

Screen analysis: 0.1% by weight; >40μ.

*Analysis.*—$P_2O_5$, 28.9% by weight; MgO, 17.2% by weight; $NH_3$, 6.4% by weight; loss on ignition, 54.9% by weight.

EXAMPLE 5

20.2 kg. of a $MgCl_2$ solution (31.9% strength by weight), 5.6 kg. NaOH (49.0% strength by weight), 7.7 kg. $H_3PO_4$ (85.5% strength by weight), and 8.1 kg. $NH_3$ (28.3% strength by weight) were introduced into 40 liters water having an initial temperature of 16° C. The pH-value was maintained at 5.5. During the experiment, the temperature was found to increase to 40° C. The product was worked up in the manner set forth in Example 3.

Screen analysis: 0% by weight; >40μ.

*Analysis.*—$P_2O_5$, 30.1% by weight; MgO, 16.7% by weight; $NH_3$, 6.6% by weight; loss on ignition, 53.1% by weight.

As a precipitation temperature of 15° C. is rather difficult to maintain under commercial conditions, attempts have been made to obtain the same particle size by precipitating the material at a slightly higher temperature, i.e. at 35° C. at a higher pH-value (7.5).

EXAMPLE 6

21.6 kg. $MgCl_2$ (29.7% strength by weight), 5.7 kg. NaOH (48.0% strength by weight), 7.8 kg. $H_3PO_4$ (85.0% strength by weight) and 8.7 kg. $NH_3$ (26.5% strength by weight) were introduced with agitation into 40 liters water at 35° C. The pH-value was maintained at 7.5. The product obtained was worked up in the manner set forth in Example 3.

Screen analysis: 0.4% by weight; >40μ.

*Analysis.*—$P_2O_5$, 29.6% by weight; MgO, 17.5% by weight; $NH_3$, 6.6% by weight; loss on ignition, 53.6% by weight.

EXAMPLE 7

22.1 kg. $MgCl_2$ (31.9% strength by weight), 5.7 kg. NaOH (48.0% strength by weight), 7.8 kg. $H_3PO_4$ (86.0% strength by weight) and 8.9 kg. $NH_3$ (25.3% strength by weight) were introduced, with agitation, into 40 liters water at 35° C. The pH-value was maintained at 7.5. The experiment was repeated four times, and the products were worked up in the manner set forth above and combined.

Screen analysis: 0.6% by weight; >40μ.

*Analysis.*—$P_2O_5$, 29.0% by weight; MgO, 16.6% by weight; $NH_3$, 6.7% by weight; loss on ignition, 53.9% by weight.

Gaseous $NH_3$ was used in a further test series. The pH-value of the mixture to be precipitated was regulated by varying the $NH_3$-feed rate. The $MgCl_2$-solution and phosphoric acid were mixed in stoichiometric proportions and the mixed solution was added dropwise at a constant rate.

EXAMPLE 8

596 grams $MgCl_2$ (31.9% strength by weight) were mixed with 228 grams $H_3PO_4$ (86.0% strength by weight) and the mixed solution was added dropwise to 2 liters water. Ammonia was supplied in measured quantities through a rotameter, and the pH-value was maintained between 5 and 6. 150 liters or 6.7 mols $NH_3$ were consumed.

The temperature was 60° C.

Screen analysis: 97% by weight; >40μ.

*Analysis.*—$P_2O_5$, 28.5% by weight; MgO, 16.7% by weight; $NH_3$, 6.7% by weight; loss on ignition, 54.8% by weight.

EXAMPLE 9

The procedure was the same as that described in Example 8, save that a temperature of 40° C. was used. 150 liters or 6.7 mols $NH_3$ were consumed.

Screen analysis: 85% by weight; >40μ.

*Analysis.*—$P_2O_5$, 27.3% by weight; MgO, 16.6% by weight; $NH_3$, 6.8% by weight; loss on ignition, 54.9% by weight.

EXAMPLE 10

The procedure was the same as that described in Example 8, save that a pH-value between 7 and 8 was used at a temperature of 25° C. 150 liters or 6.7 mols $NH_3$ were consumed.

Screen analysis: 5% by weight; >40μ.

*Analysis.*—$P_2O_5$, 28.8% by weight; MgO, 16.5% by weight; $NH_3$, 6.7% by weight; loss on ignition, 54.9% by weight.

We claim:

1. A process for producing magnesium-ammonium phosphate hexahydrate having a predetermined particle size which comprises simultaneously introducing into a reactor phosphoric acid, an inorganic magnesium salt solution and ammonia at a constant temperature between 10–60° C. and at a constant pH-value between 5–8, effecting the reaction at 40–60° C. coupled with a pH-value of 5–7 for producing magnesium ammonium phosphate hexahydrate of which more than 5% have a particle size of more than 40μ and effecting the reaction at 10–30° C. coupled with pH-values of 5–8 for producing magnesium-ammonium phosphate-hexahydrate of which less than 1% has a particle size of more than 40μ.

2. The process of claim 1, wherein the ammonia reactant is used in the form of an aqueous solution.

3. The process of claim 1, wherein gaseous ammonia is used.

4. The process of claim 1, wherein an alkali liquor is used as an additional reactant.

References Cited

UNITED STATES PATENTS 3,126,254  3/1964  Salutsky et al. _____ 23—105
3,320,048  5/1967  Legal et al. _____ 71—42

HERBERT T. CARTER, Primary Examiner

U.S. Cl. X.R.

167—60